US009696771B2

(12) United States Patent
Park et al.

(10) Patent No.: US 9,696,771 B2
(45) Date of Patent: Jul. 4, 2017

(54) METHODS AND SYSTEMS FOR OPERATING MULTI-CORE PROCESSORS

(71) Applicant: Samsung Electronics Co., Ltd., Suwon-si (KR)

(72) Inventors: Kang Nam Park, Ansan-si (KR); Eui Youl Ryu, Yongin-si (KR); Young Lak Kim, Seongnam-si (KR); Woo Sung Lee, Seoul (KR); Jae Cheol Lee, Suwon-si (KR); Seung Kon Hwang, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 404 days.

(21) Appl. No.: 14/100,483

(22) Filed: Dec. 9, 2013

(65) Prior Publication Data

US 2014/0173311 A1    Jun. 19, 2014

(30) Foreign Application Priority Data

Dec. 17, 2012 (KR) .................. 10-2012-0147705

(51) Int. Cl.
  *G06F 1/32* (2006.01)
  *G06F 1/20* (2006.01)
  *G06F 9/50* (2006.01)

(52) U.S. Cl.
  CPC .............. *G06F 1/206* (2013.01); *G06F 1/324* (2013.01); *G06F 1/3206* (2013.01); *G06F 1/329* (2013.01); *G06F 1/3287* (2013.01); *G06F 9/5094* (2013.01); *Y02B 60/1217* (2013.01); *Y02B 60/1275* (2013.01); *Y02B 60/1282* (2013.01); *Y02B 60/142* (2013.01); *Y02B 60/144* (2013.01)

(58) Field of Classification Search
  CPC ..... G06F 1/00; G06F 1/04; G06F 1/12; G06F 1/26; G06F 1/32; G06F 11/30; G06F 15/16
  See application file for complete search history.

(56) References Cited

U.S. PATENT DOCUMENTS

| 7,249,268 | B2 | 7/2007 | Bhandarkar |
| 7,490,254 | B2 | 2/2009 | Clark |
| 7,502,948 | B2 | 3/2009 | Rotem et al. |
| 8,250,395 | B2 | 8/2012 | Carter et al. |
| 8,793,512 | B2 | 7/2014 | Branover et al. |

(Continued)

FOREIGN PATENT DOCUMENTS

| KR | 10-2007-0013631 A | 1/2007 |
| KR | 10-2011-0073714 A | 6/2011 |

(Continued)

*Primary Examiner* — Thomas Lee
*Assistant Examiner* — Mohammad A Rahman
(74) *Attorney, Agent, or Firm* — Ward and Smith, P.A.

(57) ABSTRACT

A method of operating a system on chip (SoC) includes determining to switch from a selected low-power core among a plurality of low-power cores to a high-performance core among a plurality of high-performance cores, counting the number of high-performance cores that are operating among a plurality of high-performance cores, determining a maximum operating frequency of the plurality of high-performance cores based on the counted number, and switching from the selected low-power core to the selected high-performance core based on the determined maximum operating frequency.

8 Claims, 12 Drawing Sheets

(56) References Cited

U.S. PATENT DOCUMENTS

| | | | |
|---|---|---|---|
| 2008/0072079 A1* | 3/2008 | Bieswanger | G06F 1/3203 |
| | | | 713/300 |
| 2008/0127192 A1* | 5/2008 | Capps | G06F 1/3203 |
| | | | 718/103 |
| 2008/0263324 A1 | 10/2008 | Sutardja et al. | |
| 2009/0222654 A1* | 9/2009 | Hum | G06F 13/24 |
| | | | 713/100 |
| 2010/0058086 A1 | 3/2010 | Lee | |
| 2010/0131781 A1* | 5/2010 | Memon | G06F 1/3209 |
| | | | 713/310 |
| 2011/0119672 A1* | 5/2011 | Ramaraju | G06F 9/5044 |
| | | | 718/102 |
| 2012/0146708 A1 | 6/2012 | Naffziger et al. | |
| 2012/0198207 A1* | 8/2012 | George | G06F 1/3206 |
| | | | 712/36 |
| 2014/0101411 A1* | 4/2014 | Sakarda | G06F 15/7842 |
| | | | 712/42 |
| 2014/0129808 A1* | 5/2014 | Naveh | G06F 9/4856 |
| | | | 712/225 |

FOREIGN PATENT DOCUMENTS

| | | |
|---|---|---|
| KR | 10-1065436 B2 | 9/2011 |
| KR | 10-2012-0090298 A | 8/2012 |

\* cited by examiner

METHODS AND SYSTEMS FOR OPERATING MULTI-CORE PROCESSORS

CROSS-REFERENCE TO RELATED APPLICATION

This application claims priority under 35 U.S.C. §119(a) to Korean Patent Application No. 10-2012-0147705 filed on Dec. 17, 2012, the disclosure of which is hereby incorporated by reference in its entirety.

FIELD

The present invention generally relates to processors and, more particularly, is concerned with operating multi-core processors.

BACKGROUND

Dynamic voltage and frequency scaling (DVFS) is a technique of improving power and heat managing performance by adjusting voltage and operating frequency according to the operation state of a processor.

Intel's Enhanced Intel Speedstep Technology (EIST) and Enhanced C1 (Halt) State (C1E) are examples of power management technologies. In the C1E technology, a CPU receives a halt command when a system maintains an idle state. When receiving the halt command, the CPU reduces the operating frequency and voltage. When receiving a load again, the CPU restores the original operating frequency and voltage.

Alternatively, EIST depends on a CPU load. When the CPU load is low, the CPU maintains a lower voltage and operating frequency. When the CPU load increases, the voltage and the operating frequency are increased.

Turbo boost is a further-developed technology. With turbo boost, operating frequency is increased above a rated frequency but within a thermal design power (TDP) limit according to the state of a CPU.

In processors that have multiple cores within a single cluster, a high-performance core may exhibit high power consumption, heat generation, and instability. As the number of high-performance cores being used increases, power consumption and heat generation increase greatly.

SUMMARY

According to an exemplary embodiment of the inventive concept, there is provided a method of operating a system on chip (SoC). The method includes determining to switch from a selected low-power core among a plurality of low-power cores to a high-performance core among a plurality of high-performance cores, counting the number of high-performance cores that are operating among the plurality of high-performance cores, determining a maximum operating frequency of the plurality of high-performance cores based on the counted number, and switching from the selected low-power core to the selected high-performance core based on the determined maximum operating frequency.

The determining to switch from the selected low-power core to the selected high-performance core may include measuring a central processing unit (CPU) load of the selected low-power core and determining to switch from the selected low-power core to the selected high-performance core when the CPU load exceeds a threshold value.

The switching from the selected low-power core to the selected high-performance core may include storing context of the selected low-power core in a memory, powering on the selected high-performance core, powering on an L2 cache of the selected high-performance core, loading the context of the selected low-power core from the memory to the selected high-performance core, and powering off the selected low-power core.

According to other embodiments of the inventive concept, there is provided a system including a multi-core CPU. The multi-core CPU includes a low-power cluster which includes at least one low-power core and a high-performance cluster which includes at least one high-performance core.

The multi-core CPU may count the number of high-performance cores that are operating among the at least one high-performance core, determine a maximum operating frequency of the at least one high-performance core based on the counted number, and switch from the at least one low-power core to the at least one high-performance core based on the maximum operating frequency.

The multi-core CPU may measure a CPU load of the at least one low-power core and determine to switch from the at least one low-power core to the at least one high-performance core when the CPU load exceeds a threshold value.

According to another exemplary embodiment of the inventive concept, there is provided another method of operating a system on chip (SoC). This method includes determining to switch from a selected low-power core among a plurality of low-power cores to a high-performance core among a plurality of high-performance cores, counting the number of high-performance cores that are operating among the plurality of high-performance cores, determining a maximum operating frequency of the plurality of high-performance cores based on the counted number, setting the maximum operating frequency of the plurality of high-performance cores to the determined maximum operating frequency, and switching from the selected low-power core to the selected high-performance core.

According to other embodiments of the inventive concept, there is provided a system including a multi-core CPU. The multi-core CPU includes a low-power cluster which includes a plurality of low-power cores and a high-performance cluster which includes a plurality of high-performance cores.

The multi-core CPU may count the number of high-performance cores that are operating among the plurality of high-performance cores, determine a maximum operating frequency of the plurality of high-performance cores based on the counted number, and switch from at least one low-power core to at least one high-performance core based on the maximum operating frequency.

The multi-core CPU may measure a CPU load of at least one low-power core and determine to switch from the at least one low-power core to at least one high-performance core when the CPU load exceeds a threshold value.

DETAILED DESCRIPTION OF THE EMBODIMENTS

Figure 1:
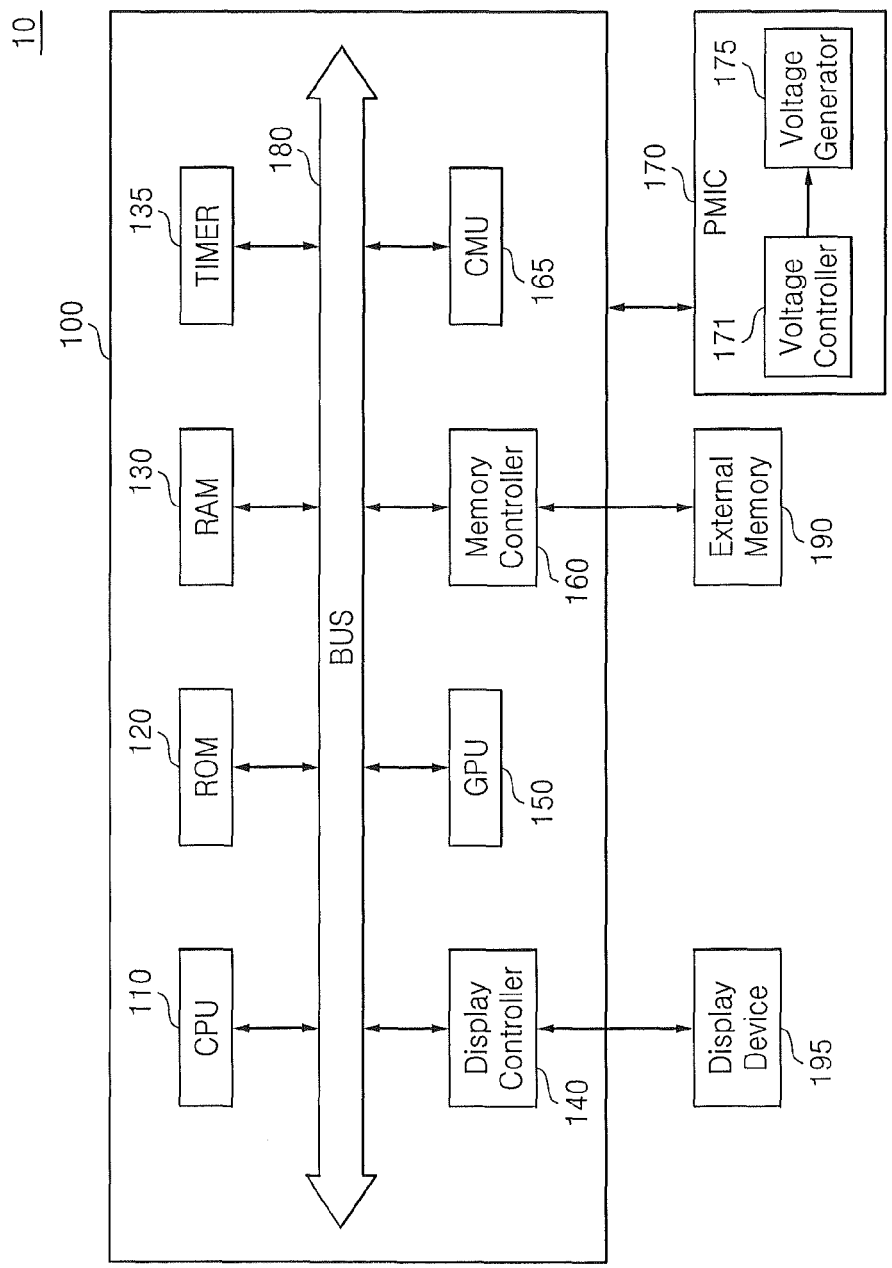
FIG. 1 is a block diagram of an electronic system according to an exemplary embodiment of the inventive concept.

The inventive concept is described fully herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Accordingly, aspects of the present disclosure may be implemented entirely hardware, entirely software (including firmware, resident software, micro-code, etc.) or combining software and hardware implementation that may all generally be referred to herein as a "circuit," "controller,", "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, assembly language, dynamic programming languages such as Python, Ruby and Groovy, or other programming languages.

Aspects of the present disclosure are described herein with reference to flowchart illustrations and/or block diagrams of methods, apparatus (systems), and computer program products according to embodiments of the disclosure. It will be understood that each block of the diagrams, and combinations of diagrams, can be implemented by computer program instructions. These computer program instructions may be provided to a controller (or processor) of a general purpose computer, special purpose computer, or other programmable data processing apparatus to produce a machine, such that the instructions, which execute via the processor of the computer or other programmable instruction execution apparatus, create a mechanism for implementing the functions/acts specified in the diagram.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 2:
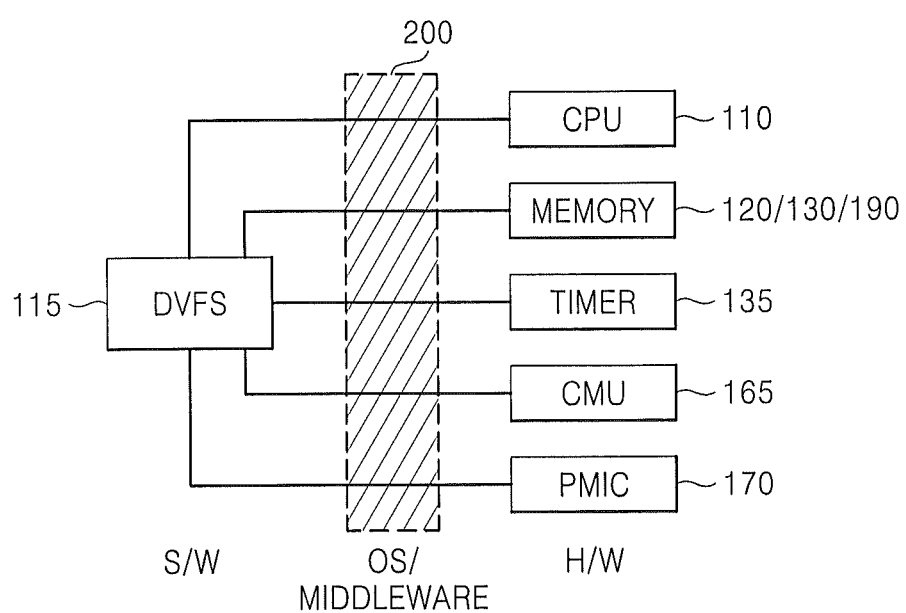
FIG. 2 is a block diagram of the relationship between dynamic voltage and frequency scaling (DVFS) and other elements according to an exemplary embodiment of the inventive concept.

FIG. 1 is a block diagram of an electronic system 10 according to an exemplary embodiment of the inventive concept. FIG. 2 is a block diagram of the relationship between dynamic voltage and frequency scaling (DVFS) and other elements according to an exemplary embodiment of the inventive concept.

Referring to FIG. 1, the electronic system 10 may be implemented as a handheld device such as a mobile telephone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, mobile internet device (MID), or an e-book.

The electronic system 10 may include a system on chip (SoC) 100, an external memory 190, and a display device 195.

The SoC 100 may include a central processing unit (CPU) 110, a read-only memory (ROM) 120, a random access memory (RAM) 130, a timer 135, a display controller 140, a graphics processing unit (GPU) 150, a memory controller 160, a clock management unit (CMU) 165, and a bus 180. The SoC 100 may also include other elements. The electronic system 10 may also include a power management integrated circuit (PMIC) 170.

The PMIC 170 is implemented outside the SoC 100 in the embodiments illustrated in FIG. 1, but the SoC 100 may include a power management unit (PMU) that can perform the function of the PMIC 170 in other embodiments. The PMIC 170 may include a voltage controller 171 and a voltage generator 175.

The CPU 110, which may be referred to as a processor, may process or execute programs and/or data stored in the external memory 190. For instance, the CPU 110 may process or execute the programs and/or the data in response to an operating clock signal output from the CMU 165.

The CPU 110 may be implemented by a multi-core processor. The multi-core processor may be a single computing component with two or more independent actual processors (referred to as cores). Each of the processors reads and executes program instructions.

The programs and/or the data stored in the ROM 120, the RAM 130, and/or the external memory 190 may be loaded to a memory (not shown) in the CPU 110. The ROM 120 may store permanent programs and/or data. The ROM 120 may be implemented by erasable programmable ROM (EPROM) or electrically erasable programmable ROM (EEPROM).

The RAM 130 may temporarily store programs, data, or instructions. The programs and/or data stored in the memory 120 or 190 may be temporarily stored in the RAM 130 according to the control of the CPU 110 or a booting code stored in the ROM 120. The RAM 130 may be implemented by dynamic RAM (DRAM) or static RAM (SRAM).

The timer 135 may output a count value indicating a time based on an operating clock signal output from the CMU 165. The GPU 150 may convert data read by the memory controller 160 from the external memory 190 into a signal suitable to the display device 195. The CMU 165 generates the operating clock signal. The CMU 165 may include a clock signal generator such as a phase locked loop (PLL), a delay locked loop (DLL), or a crystal oscillator.

The operating clock signal may be applied to the GPU 150. The operating clock signal may also be applied to another element (e.g., the CPU 110 or the memory controller 160). The CMU 165 may change the frequency of the operating clock signal according to the control of DVFS (115 in FIG. 2).

The CPU 110 may assign a task to a low-power core, measure a CPU load in the low-power core, and adjust an operating frequency based on the measured CPU load. The CPU 110 may make a switch from the low-power core to a high-performance core based on the measured CPU load.

The DVFS 115 may set the operating frequency of the high-performance core to a maximum value. Before the switch from the low-power core to the high-performance core is made, the DVFS 115 may count the number of high-performance cores that have been operating. When the counted number is zero, the DVFS 115 may set the operating frequency of the high-performance core, to which the switch is made, to the maximum value and control the operation of the CMU 165. Under the control of the DVFS 115, the CMU 165 may change the frequency of the operating clock signal.

The voltage controller 171 may control the voltage generator 175 based on a DVFS policy selected by the DVFS 115. According to the control of the voltage controller 171, the voltage generator 175 may generate an operating voltage for the CPU 110 based on the selected DVFS policy and output the operating voltage to the CPU 110.

The memory controller 160 interfaces with the external memory 190. The memory controller 160 controls the overall operation of the external memory 190 and controls data exchange between a host and the external memory 190.

For instance, the memory controller 160 may write data to the external memory 190 or read data from the external memory 190 at the request of the host. Here, the host may be a master device such as the CPU 110, the GPU 150, or the display controller 140.

The external memory 190 is a storage medium for storing data and may store an operating system (OS) and various kinds of programs and/or data. The external memory 190 may be DRAM, but the inventive concept is not restricted to the current embodiments.

For instance, the external memory 190 may be non-volatile memory such as flash memory, phase-change RAM (PRAM), magnetic RAM (MRAM), resistive RAM (ReRAM) or ferroelectric RAM (FeRAM). In other embodiments, the external memory 190 may be an embedded memory provided within the SoC 100. The external memory 190 may also be an embedded multimedia card (eMMC) or a universal flash storage (UFS). The elements 110, 120, 130, 140, 150, and 160 may communicate with one another through a bus 180.

The display device 195 may display image signals output from the display controller 140. The display device 195 may be implemented by a liquid crystal display (LCD) device, a light emitting diode (LED) display device, an organic LED (OLED) display device, an active-matrix OLED (AMOLED) display device, or a flexible display device.

The display controller 140 controls the operation of the display device 195.

The DVFS 115 may be implemented in software (S/W) or firmware. The DVFS 115 may be implemented as a program, installed in the memory 120, 130, or 190, and executed by the CPU 110 when the SoC 100 is powered on. The DVFS 115 may control at least one of the memories 120, 130, and 190, the timer 135, the CPU 110, the CMU 165, and the PMIC 170. An OS and/or middleware 200, which may be referred to as a kernel 200, may intervene between the DVFS 115 and each of the elements 110, 120, 130, 135, 165, 170, and 190.

Figure 3:
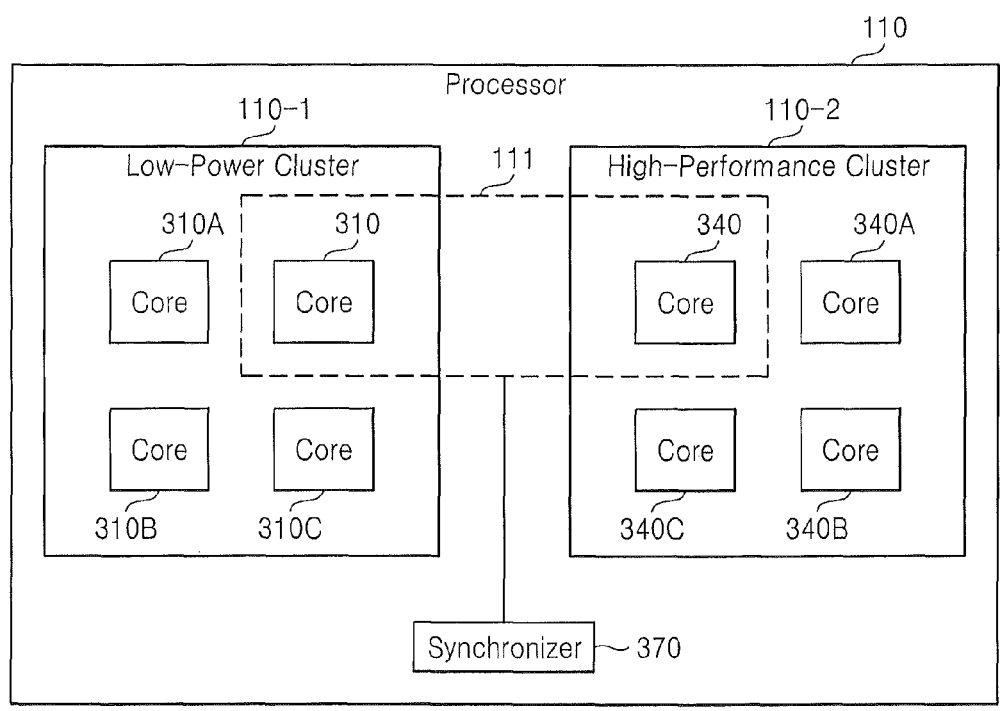
FIG. 3 is a block diagram of a processor according to an exemplary embodiment of the inventive concept.

FIG. 3 is a block diagram of the processor 110 according to an exemplary embodiment of the inventive concept. The processor 110 may include a low-power cluster 110-1 and a high-performance cluster 110-2. The low-power cluster 110-1 may include a plurality of low-power cores 310 and 310A through 310C. The low-power cores 310 and 310A through 310C may consume low power and operate at a low operating frequency. The high-performance cluster 110-2 may include a plurality of high-performance cores 340 and 340A through 340C. The high-performance cores 340 and 340A through 340C may consume high power and operate at a high operating frequency.

The processor 110 may include both the low-power cores 310 and 310A through 310C and the high-performance cores 340 and 340A through 340C and may operate them according to a CPU load. The processor 110 may drive one or more of the low-power cores 310 and 310A through 310C when the CPU load is low and may drive one or more of the high-performance cores 340 and 340A through 340C when the CPU load is high.

When the number of operating cores among the high-performance cores 340 and 340A through 340C increases, the processor 110 may decrease the maximum operating frequency of the high-performance cores 340 and 340A through 340C in inverse proportion to the increasing number of operating cores.

The processor 110 may reduce current consumption and heat generation by decreasing the maximum operating frequency as the number of operating high-performance cores increases. In addition, the processor 110 may measure a temperature of one or more of the high-performance cores 340 and 340A through 340C using a temperature sensor and make a switch from the one or more of the high-performance cores 340 and 340A through 340C to one or more of the low-power cores 310 and 310A through 310C when the measured temperature exceeds a threshold value, thereby managing heat generation. When this occurs, the processor 110 may operate stably by driving the low-power cores 310 and 310A through 310C.

Figure 4:
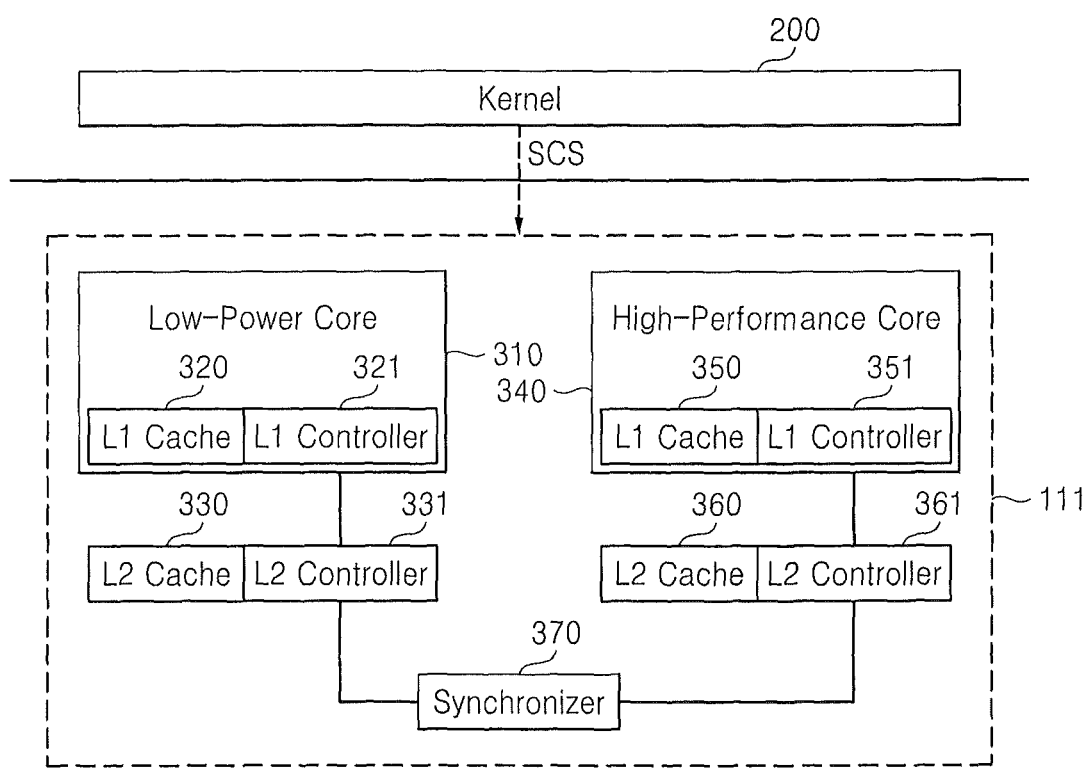
FIG. 4 is a block diagram of the relationship between a central processing unit (CPU) and a kernel according to an exemplary embodiment of the inventive concept.

FIG. 4 is a diagram of the relationship between the CPU 110 and the kernel 200 according to an exemplary embodiment of the inventive concept. The CPU 110 includes the low-power cluster 110-1 including the low-power core 310 and the high-performance cluster 110-2 including the high-performance core 340 respectively corresponding to the low-power core 310.

The kernel 200 may make a switch from the low-power core 310 to the high-performance core 340 when the CPU load measured in the low-power core 310 exceeds a threshold value.

In preparation for the switch made by the kernel 200, a synchronizer 370 may synchronize an L2 cache 330 connected to the low-power core 310 with an L2 cache 360 connected to the high-performance core 340.

Due to the data synchronization between the L2 caches 330 and 360, a switched core 310 or 340 can execute a given task immediately. An L1 cache 320 is a cache memory included in the core 310 and an L1 cache 350 is a cache memory included in the core 340. L2 controllers 331 and 361 may control the operation of the L2 caches 330 and 360, respectively. L1 controllers 321 and 351 may control the operation of the L1 caches 320 and 360, respectively.

Figure 5:
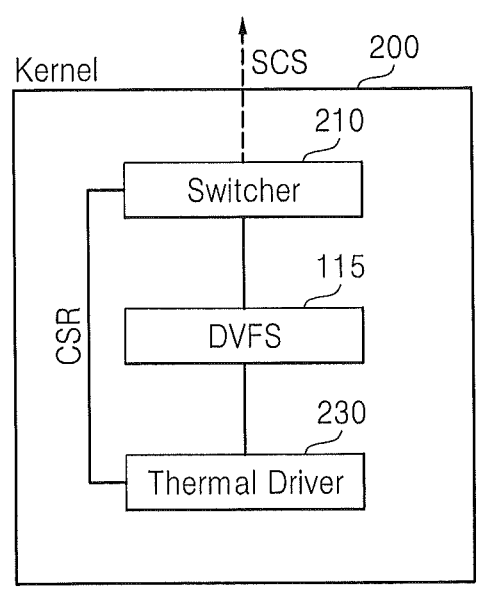
FIG. 5 is a block diagram of the kernel according to an exemplary embodiment of the inventive concept.

FIG. 5 is a block diagram of the kernel 200 according to an exemplary embodiment of the inventive concept.

Referring to FIGS. 4 and 5, the kernel 200 may include a switcher 210 making a switch between the cores 310 and 340 having different performance, the DVFS 115 measuring a CPU load and adjusting the operating frequency of the core 310 or 340, and a thermal driver 230 measuring the temperature of at least one of the cores 310 and 340 and adjusting the operating frequency of the at least one of the cores 310 and 340.

The DVFS 115, the kernel 200, the switcher 210, and the thermal driver 230 may be hardware that can perform functions and operations corresponding to their names, a computer program code that can execute particular functions and operations, or an electronic recording medium, e.g., a processor, equipped with the computer program code. In other words, the elements 115, 200, 210, and 230 may be the functional and/or structural combination between hardware for realizing the inventive concept and software for driving the hardware.

The switcher 210 may make a switch from the low-power core 310 to the high-performance core 340 when the CPU load measured in the low-power core 310 exceeds a threshold value. The switcher 210 may make a switch from the high-performance core 340 to the low-power core 310 when the CPU load measured in the high-performance core 340 is equal to or less than the threshold value.

As shown in FIG. 3, the low-power cluster 110-1 may include a plurality of low-power cores 310 and 310A through 310C and the high-performance cluster 110-2 may include a plurality of high-performance cores 340 and 340A through 340C respectively corresponding to the low-power cores 310 and 310A through 310C. The low-power cores 310 and 310A through 310C may be low-performance cores.

When switching from the low-power core 310 to the high-performance core 340, the DVFS 115 may check the number of operating cores among the high-performance cores 340A through 340C and set the maximum operating frequency of the switched high-performance core 340 to a maximum value when the checked number is zero. In other words, when only one high-performance core 340 is switched, the DVFS 115 may set the maximum operating frequency to the maximum value.

When the number of operating cores among the high-performance cores 340A through 340C increases, the DVFS 115 may decrease the maximum operating frequency of the operating cores and the switched high-performance core 340. The DVFS 115 may also decrease the maximum operating frequency of the high-performance cores 340 and 340A through 340C when the number of the high-performance cores 340 and 340A through 340C increases.

The DVFS 115 may adjust the maximum operating frequency of the high-performance cores 340 and 340A through 340C, thereby securing the stable operation of the high-performance cores 340 and 340A through 340C.

The thermal driver 230 may control a thermal management unit (TMU) measuring the temperature of the high-performance core 340 and collecting temperature information of the high-performance core 340. The thermal driver 230 may adjust the operating frequency of the high-performance core 340 based on the temperature information of the high-performance core 340. The thermal driver 230 may output a core switch request CSR to the switcher 210 when the temperature of the high-performance core 340 exceeds a threshold value.

The switcher 210 makes a switch from the high-performance core 340 to the low-power core 310 in response to the core switch request CSR output from the thermal driver 230 when the temperature of the high-performance core 340 exceeds the threshold value.

The switcher 210 may make a switch from the low-power core 310 to the high-performance core 340 when a CPU load exceeds the threshold value and also make a switch from the high-performance core 340 to the low-power core 310 when the temperature of the high-performance core 340 exceeds the threshold value.

Figure 6:
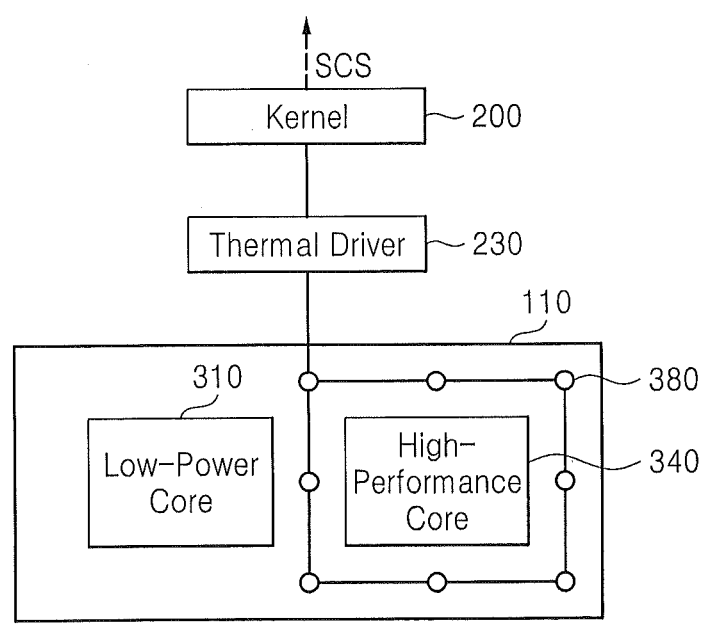
FIG. 6 is a block diagram of the relationship among the CPU, a thermal driver, and the kernel according to an exemplary embodiment of the inventive concept.

FIG. 6 is a block diagram of the relationship among the CPU 110, the thermal driver 230, and the kernel 200 according to an exemplary embodiment of the inventive concept. The thermal driver 230 may control a temperature sensor through a TMU 380. The thermal driver 230 may measure a temperature using a temperature sensor included in the high-performance core 340. The thermal driver 230 may provide the measured temperature to the kernel 200.

The thermal driver 230 may adjust the operating frequency of the high-performance core 340 based on the increase and decrease in temperature of the high-performance core 340. The thermal driver 230 may decrease the operating frequency of the high-performance core 340 when the temperature of the high-performance core 340 increases and may increase the operating frequency of the high-performance core 340 when the temperature of the high-performance core 340 decreases.

The kernel 200 may measure the temperature of the operating high-performance cores 340A through 340C and the switched high-performance core 340 using the thermal driver 230 and make a switch from the operating high-performance cores 340A through 340C and the switched high-performance core 340 to the low-power cores 310 and 310A through 310C, when the measured temperature exceeds a threshold value.

Figure 7:
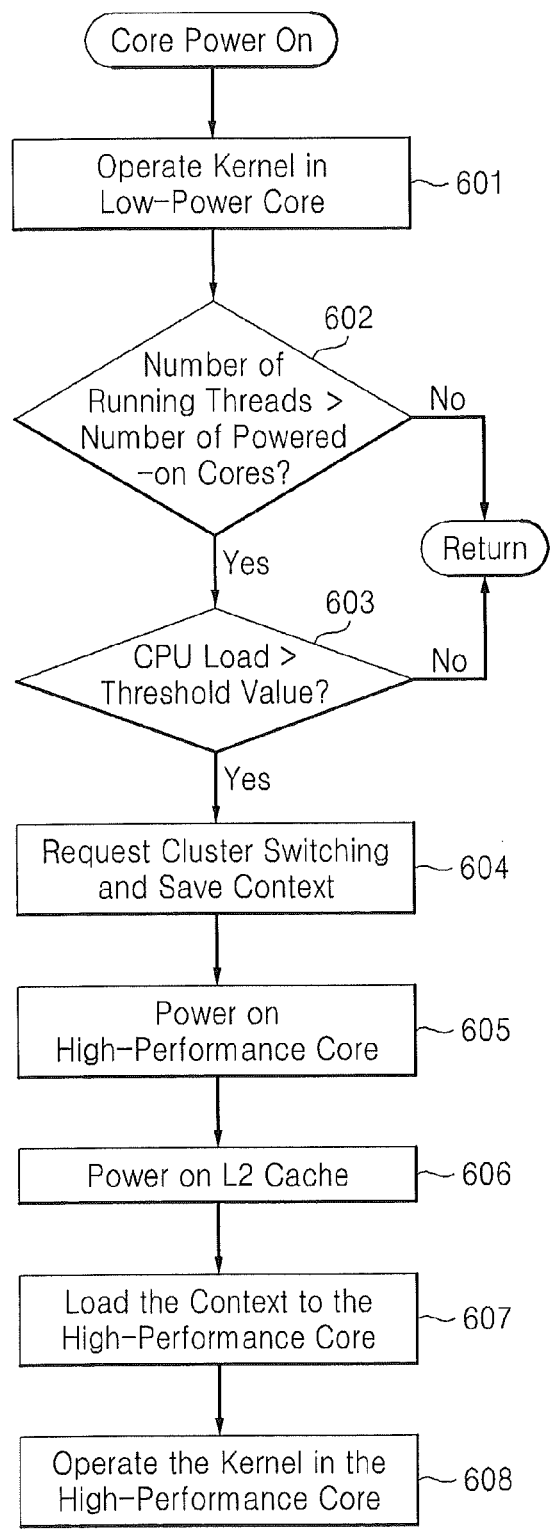
FIG. 7 is a flowchart of a method of operating a system on chip (SoC) according to an exemplary embodiment of the inventive concept.

FIG. 7 is a flowchart of a method of operating the SoC 100 according to an exemplary embodiment of the inventive concept.

The operation of the kernel 200 operating in the SoC 100 is described with reference to FIGS. 1 through 7. The kernel 200 may initially operate using the low-power core 310 in the SoC 100 when power is on.

When power is supplied to the SoC 100, the low-power core 310 may execute the kernel 200 in operation 601. The kernel 200 may operate a plurality of the low-power cores 310 and 310A through 310C according to the amount of task. If the CPU load increases, the kernel 200 may switch from the low-power cores 310 and 310A through 310C to the high-performance cores 340 and 340A through 340C. The kernel 200 may assign a task to the low-power core 310 which is operating through task scheduling.

The kernel 200 may measure a CPU load at the low-power core 310 assigned with the task. To measure the CPU load, the kernel 200 may operate a performance monitoring unit (PMU), measure the amount of data input to the low-power core 310 and/or the amount of data output from the low-power core 310, and measure the memory usage of the low-power core 310.

The kernel 200 may adjust the operating frequency according to the increase or decrease in the CPU load. The kernel 200 may increase the operating frequency when the CPU load increases and decrease the operating frequency when the CPU load decreases.

When the number of running threads is greater than the number of powered-on cores in operation 602, the kernel 200 may determine whether the CPU load exceeds a threshold in operation 603. A thread may allow a task to correctly reenter an original execution site during multitasking.

When the CPU load exceeds the threshold value, the kernel 200 may request a cluster switch and save the context of the low-power core 310 in operation 604. Here, the cluster switch may indicate a switch from the low-power core 310 to the high-performance core 340.

The kernel 200 may power on the high-performance core 340 in operation 605 and power on the L2 cache 360 of the high-performance core 340 in operation 606. The kernel 200 may supply power to the high-performance core 340 and the L2 cache 360 to operate the high-performance core 340. The kernel 200 may load the context of the low-power core 310 to the high-performance core 340 in operation 607 and power off the low-power core 310. Subsequently, the kernel 200 may operate in the high-performance core 340 in operation 608.

The kernel 200 may set the maximum operating frequency to a maximum value when there is only one high-performance core 340 that has been switched, so that the high-performance core 340 can show the best performance. The kernel 200 may operate in the high-performance core 340 but may switch from the high-performance core 340 to the low-power core 310 when the CPU load is equal to or less than a threshold value.

Figure 8A:
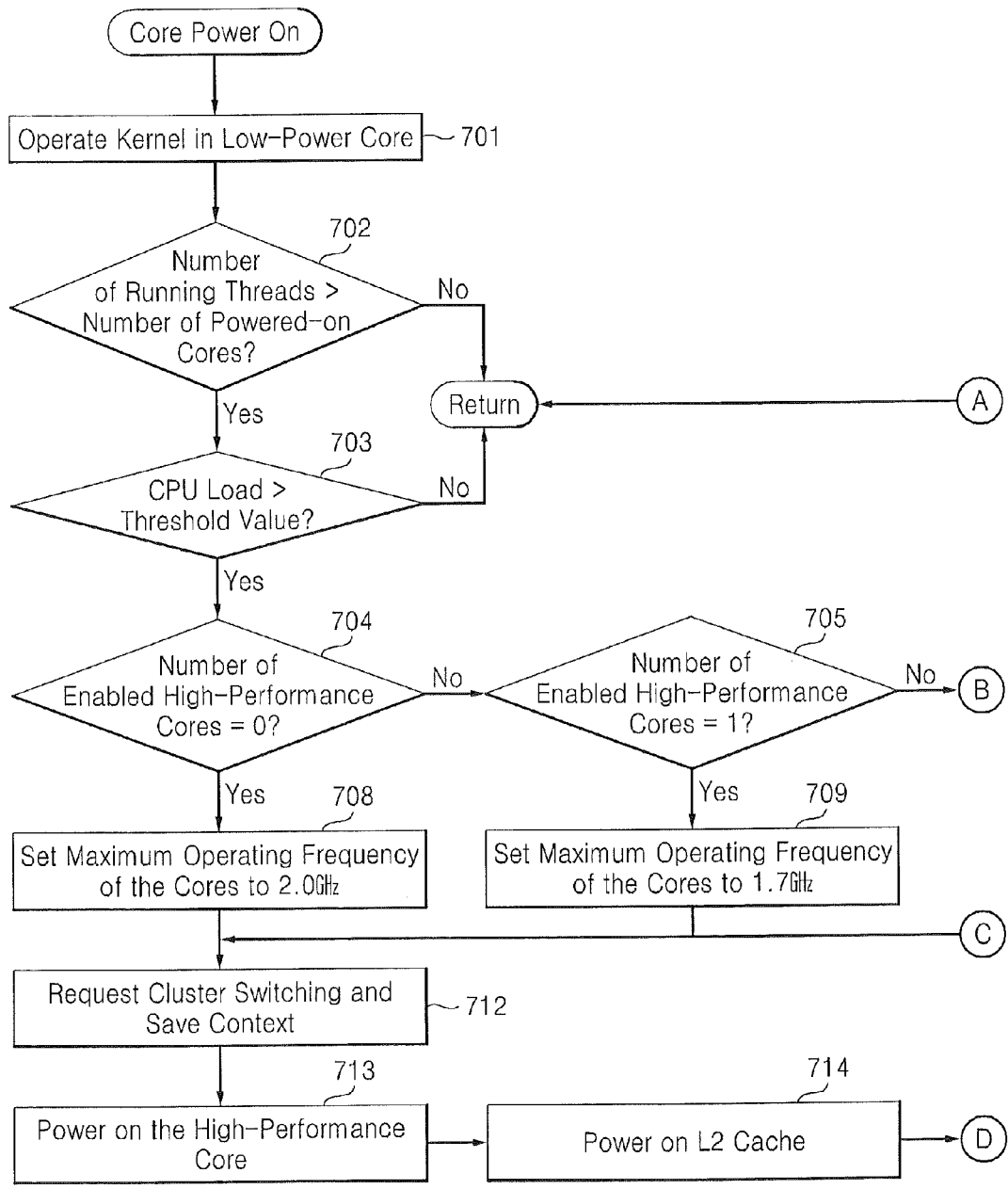
FIGS. 8A and 8B provide a flowchart of a method of operating a SoC according to other embodiments of the inventive concept.
Figure 8B:
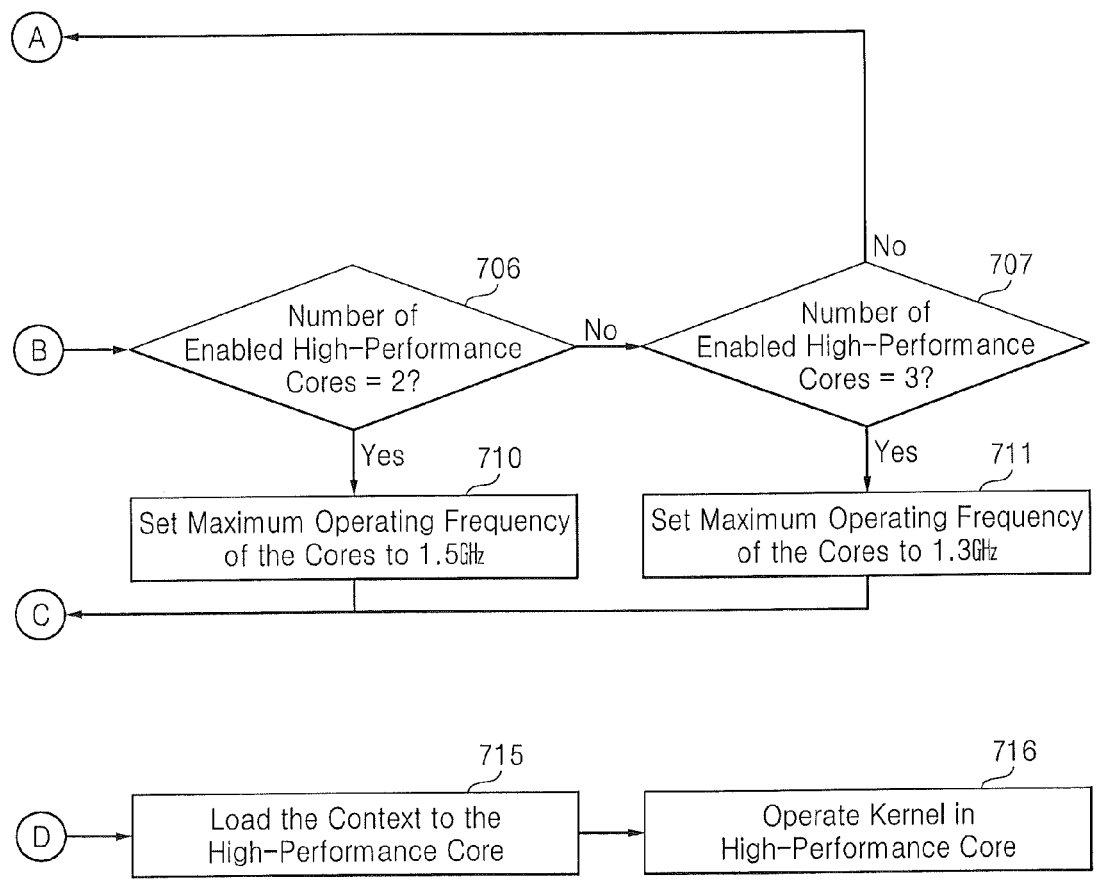

Combined, FIGS. 8A and 8B are a flowchart of a method of operating the SoC 100 according to other embodiments of the inventive concept. The operation of the kernel 200 operating in the SoC 100 is described with reference to FIGS. 1 through 6 and FIGS. 8A and 8B. The SoC 100 may operate the kernel 200 in a multi-core architecture including the low-power core 310 and the high-performance core 340.

When the number of running threads is greater than the number of powered-on cores in operation 702, the kernel 200 may determine whether the CPU load of the low-power core 310 exceeds a threshold in operation 703. When the CPU load exceeds the threshold value, the kernel 200 may request a cluster switch. When switching from the low-power core 310 to the high-performance core 340 in response to the cluster switch, the kernel 200 may check the number of enabled cores among the high-performance cores 340A through 340C in operation 704.

The kernel 200 may set the maximum operating frequency of the enabled cores among the high-performance cores 340A through 340C and the switched high-performance core 340 based on the number of the enabled cores among the high-performance cores 340A through 340C.

For instance, the kernel 200 may decrease the maximum operating frequency when the number of the enabled high-performance cores increases. The following includes specific exemplary values which may differ in alternate embodiments. When the number of the enabled high-performance cores is 0 in operation 704, the kernel 200 may set the maximum operating frequency of the switched high-performance core 340 to 2 GHz in operation 708. When the number of the enabled high-performance cores is 1 in operation 705, the kernel 200 may set the maximum operating frequency of the high-performance cores 340 and 340A to 1.7 GHz in operation 709.

When the number of the enabled high-performance cores is 2 in operation 706, the kernel 200 may set the maximum operating frequency of the high-performance cores 340, 340A, and 340B to 1.5 GHz in operation 710. When the number of the enabled high-performance cores is 3 in operation 707, the kernel 200 may set the maximum operating frequency of the high-performance cores 340, 340A, 340B, and 340C to 1.3 GHz in operation 711.

In order to switch the low-power cores 310 and 310A through 310C to the high-performance cores 340 and 340A through 340C at the cluster switch request, the kernel 200 may perform the following procedure. The kernel 200 may save the context of the low-power core 310 that has been operating in response to the cluster switch request in operation 712. The saving of the context is a preparation process for context switching. The context switching is a process which can enable a transition from one program to another program without losing a current state.

After saving the context of the low-power core 310, the kernel 200 may power on the high-performance core 340 in operation 713 and may power on the L2 cache 360 of the high-performance core 340 in operation 714. The kernel 200 may load the context of the low-power core 310 to the high-performance core 340 in operation 715 and power off the low-power core 310. The kernel 200 may operate in at least one of the high-performance cores 340 and 340A through 340C in operation 716.

The kernel 200 may operate in at least one of the plurality of the high-performance cores 340 and 340A through 340C but may switch from at least one of the high-performance cores 340 and 340A through 340C to at least one of the low-power cores 310 and 310A through 310C when the CPU load of at least one of the high-performance cores 340 and 340A through 340C is equal to or less than a threshold value. The kernel 200 may operate in a multi-core architecture including one or more of the low-power cores 310 and 310A through 310C and the high-performance cores 340 and 340A through 340C.

Figure 9:
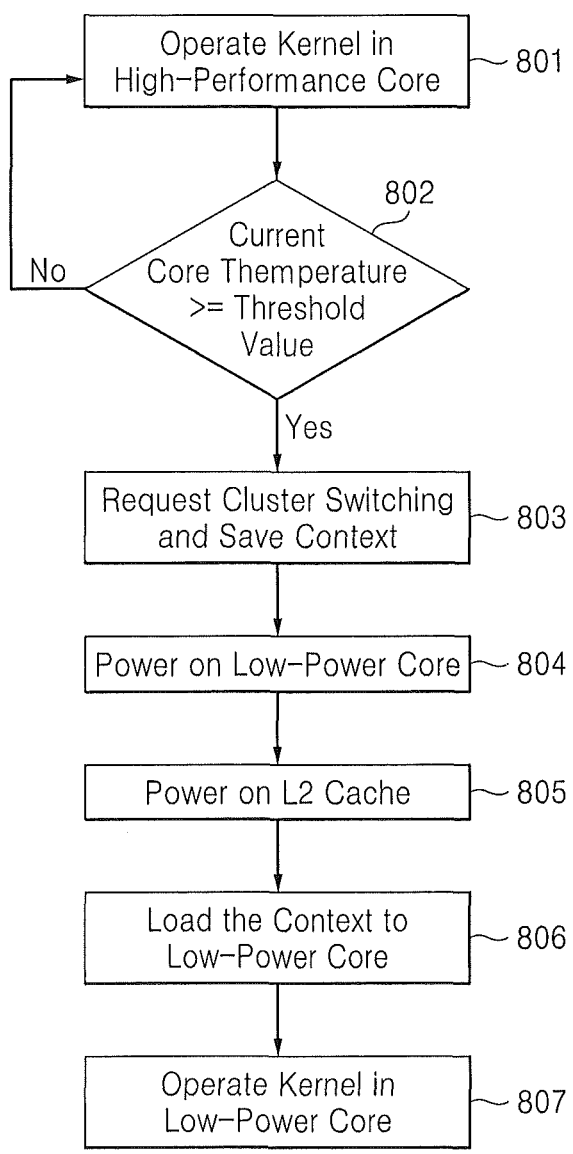
FIG. 9 is a flowchart of a method of operating a SoC according to further embodiments of the inventive concept.

FIG. 9 is a flowchart of a method of operating the SoC 100 according to further embodiments of the inventive concept. The operation of the kernel 200 operating in the SoC 100 will be described with reference to FIGS. 1 through 6 and FIG. 9. This exemplary method begins with the SoC 100 operating the kernel 200 in one or more of the high-performance cores 340 and 340A through 340C in operation 801.

The kernel 200 may measure a temperature of one or more of the enabled high-performance cores 340A through 340C and the switched high-performance core 340 in operation 802. The kernel 200 may measure the temperature in order to control the high-performance cores 340 and 340A through 340C to operate in a stable environment without being affected by an increase in temperature.

The kernel 200 may switch from one or more of the high-performance cores 340 and 340A through 340C to one or more of the low-power cores 310 and 310A through 310C when the measured temperature exceeds a threshold value. The kernel 200 may control the temperatures of the high-performance cores 340 and 340A through 340C not to increase higher through core switching.

For example, the kernel 200 may save the context of the high-performance core 340 in response to a cluster switch request in operation 803. The kernel 200 may save the context of the high-performance core 340 for context switching. The kernel 200 may power on the low-power core 310 in operation 804 and power on the L2 cache 330 of the low-power core 310 in operation 805. The kernel 200 may supply power to the low-power core 310 that may have been shut down so that the low-power core 310 may enter a standby state.

The kernel 200 may load the context of the high-performance core 340 to the low-power core 310 in operation 806 and power off the high-performance core 340. The kernel 200 may operate in the low-power core 310 in operation 807. The kernel 200 may adjust the operating frequency of the low-power core 310 based on the increase or decrease in a CPU load measured in the low-power core 310. The kernel 200 may increase the operating frequency when the CPU load increases and decrease the operating frequency when the CPU load decreases.

Figure 10:
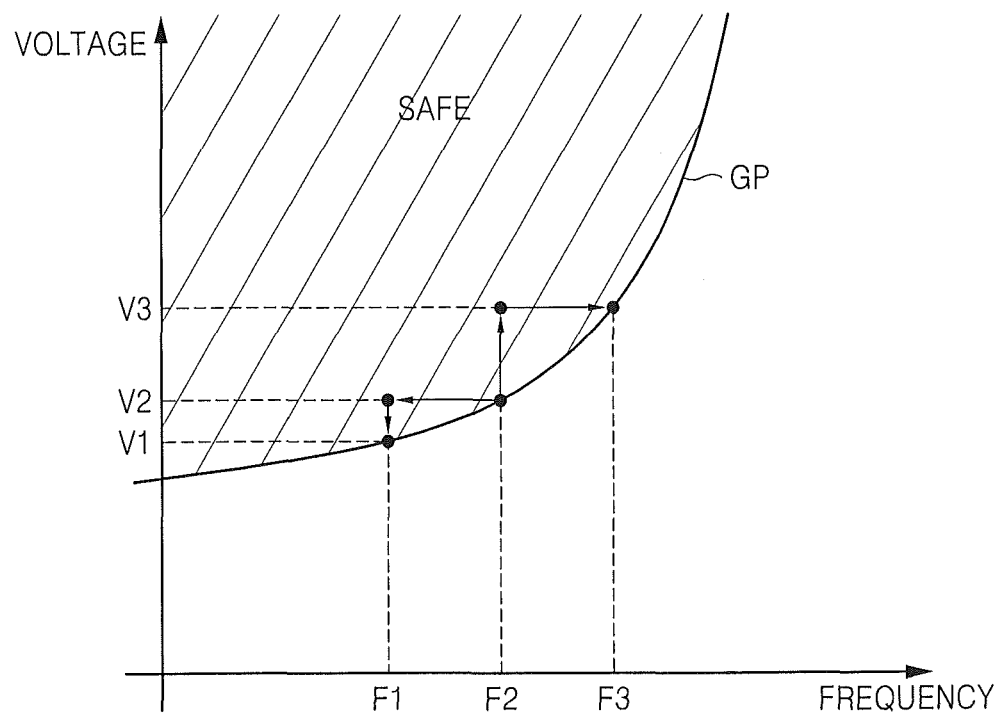
FIG. 10 is a graph showing the relationship between voltage and frequency to explain an exemplary embodiment of the inventive concept.

FIG. 10 is a graph showing the relationship between voltage and frequency to explain an exemplary embodiment of the inventive concept. The upper region above a line GP, in which voltage and frequency change, is a safe region. A procedure in which the DVFS 115 changes voltage and frequency in the safe region will be described below.

The DVFS 115 may control the CMU 165 managing the frequency of an operating clock signal and the PMIC 170 managing power to adjust the operating voltage and frequency of the CPU 110.

In order to increase the operating frequency of the CPU 110 from a second operating frequency F2 to a third operating frequency F3, the DVFS 115 may increase the operating voltage from a second voltage V2 to a third voltage V3 and then increase the operating frequency from the second operating frequency F2 to the third operating frequency F3. The following includes specific exemplary values which may differ in alternate embodiments. For instance, in order to increase the operating frequency of the CPU 110 from 1 GHz to 1.2 GHz, the DVFS 115 may increase the operating voltage from 1.0 V to 1.2 V and then increase the operating frequency from 1 GHz to 1.2 GHz.

In order to decrease the operating frequency of the CPU 110 from the second operating frequency F2 to a first operating frequency F1, the DVFS 115 may decrease the operating frequency from the second operating frequency F2 to the first operating frequency F1 and then decrease the operating voltage from the second voltage V2 to a first voltage V1. The following includes specific exemplary values which may differ in alternate embodiments. For instance, in order to decrease the operating frequency of the CPU 110 from 1 GHz to 900 MHz, the DVFS 115 may decrease the operating frequency from 1 GHz to 900 MHz and then decrease the operating voltage from 1.0 V to 0.9 V.

Figure 11:
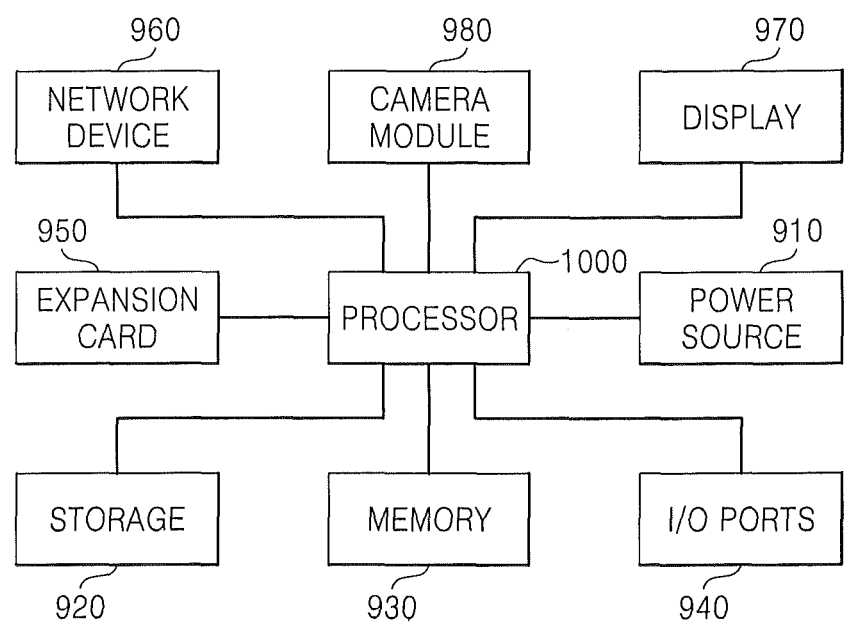
FIG. 11 is a block diagram of an electronic system including a SoC according to an exemplary embodiment of the inventive concept.

FIG. 11 is a block diagram of the electronic system 10 including the SoC 100 according to an exemplary embodiment of the inventive concept. The electronic system may be implemented as a PC, a data server, or a portable electronic device. The portable electronic device may be a laptop computer, a mobile telephone, a smart phone, a tablet PC, a PDA, an EDA, a digital still camera, a digital video camera, a PMP, a PND, a handheld game console, or an e-book.

The electronic system 10 may include the processor 1000, a power source 910, a storage 920, a memory 930, I/O ports 940, an expansion card 950, a network device 960, and a display 970. The electronic system may also include a camera module 980.

The processor 1000 may correspond to the SoC 100 illustrated in FIG. 1. The processor 1000 may be a multi-core processor. The processor 1000 may control the operation of at least one of the elements 910 through 980.

The power source 910 may supply an operating voltage to at least one of the elements 1000 and 920 through 980. The storage 920 may be implemented by a hard disk drive (HDD) or a solid state drive (SSD).

The memory 930 may be implemented by a volatile or non-volatile memory. The memory 930 may correspond to the external memory 190 illustrated in FIG. 1. A memory controller (not shown) that controls a data access operation, e.g., a read operation, a write operation (or a program operation), or an erase operation, on the memory 930 may be integrated into or embedded in the processor 1000. Alternatively, the memory controller may be provided between the processor 1000 and the memory 930.

The I/O ports 940 are ports that receive data transmitted to the electronic system 10 from an external device or transmit data from the electronic system 10 to an external device. For instance, the I/O ports 940 may be a port for connection with a pointing device such as a computer mouse, a port for connection with a printer, or a port for connection with a universal serial bus (USB) drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system to be connected with a wired or wireless network. The display 970 displays data output from the storage 920, the memory 930, the I/O ports 940, the expansion card 950, or the network device 960.

The camera module 980 is a module that can convert an optical image into an electrical image. Accordingly, the electrical image output from the camera module 980 may be stored in the storage 920, the memory 930, or the expansion card 950. In addition, the electrical image output from the camera module 980 may be displayed through the display 970.

As described above, according to an exemplary embodiment of the inventive concept, an operating frequency may be controlled when switching between a low-power core having low power consumption and a high-performance core having high performance in a processor equipped with multiple cores, so that high performance, low heat generation, and stability can be achieved. In addition, when only one high-performance core is operating, the high-performance core may be operated at the maximum operating frequency to process tasks as quickly as possible without operating another high-performance core. As a result, performance may increase and current consumption may decrease.

Moreover, the maximum operating frequency may be decreased as the number of operating high-performance cores increases, thereby reducing current consumption and heat generation that may be caused by high operating frequency and the increased number of operating high-performance cores. In addition, the temperature of a high-performance core operating at a high operating frequency may be monitored and a switch from the high-performance core to a low-power core may be made when the temperature exceeds a predetermined value, so that heat generation is managed. As a result, the processor may operate stably.

While the inventive concept has been particularly shown and described with reference to exemplary embodiments thereof, it will be understood by those of ordinary skill in the art that various changes in forms and details may be made therein without departing froth the spirit and scope of the inventive concept as defined by the following claims.

What is claimed is:

1. A method comprising:
   determining to switch from a selected low-power core among a plurality of low-power cores to a high-performance core among a plurality of high-performance cores;
   counting a number of high-performance cores that are operating among the plurality of high-performance cores;
   determining a maximum operating frequency of the plurality of high-performance cores based on the counted number; and
   switching from the selected low-power core to a selected high-performance core of the plurality of high-performance cores based on the determined maximum operating frequency, wherein the switching from the selected low-power core to the selected high-performance core comprises:
   storing context of the selected low-power core in a memory;
   powering on the selected high-performance core;
   powering on an L2 cache of the selected high-performance core;
   loading the context of the selected low-power core from the memory to the selected high-performance core; and
   powering off the selected low-power core.

2. The method of claim 1, wherein the determining to switch from the selected low-power core to the selected high-performance core comprises:
   measuring a central processing unit (CPU) load of the selected low-power core; and
   determining to switch from the selected low-power core to the selected high-performance core when the CPU load exceeds a threshold value.

3. The method of claim 1, further comprising:
   assigning a task to the selected low-power core;
   measuring a central processing unit (CPU) load of the selected low-power core assigned with the task; and
   adjusting an operating frequency of the selected low-power core based on the CPU load of the selected low-power core.

4. The method of claim 1, further comprising:
   measuring a central processing unit (CPU) load of the selected high-performance core; and
   switching from the selected high-performance core to a low-power core when the CPU load of the selected high-performance core is equal to or less than a threshold value.

5. The method of claim 1, wherein the determining the maximum operating frequency comprises setting the maximum operating frequency of the selected high-performance core to a maximum value among a plurality of predetermined maximum operating frequencies when the counted number is zero.

6. The method of claim 1, wherein the determined maximum operating frequency of the plurality of high-performance cores is in inverse proportion to the counted number.

7. The method of claim 1, further comprising;
   measuring a temperature of each of the plurality of high-performance cores; and switching from the selected high-performance core to the selected low-power core based on the temperature.

8. A non-transitory computer readable recording medium for comprising an executable program which, when executed by a processor, performs the method of claim 1.

\* \* \* \* \*